United States Patent
Dougherty

(10) Patent No.: US 6,857,652 B2
(45) Date of Patent: Feb. 22, 2005

(54) SHIELD FOR TRAILER COUPLER

(76) Inventor: Edward H. Dougherty, 1717 Lamplight Dr., Woodbury, MN (US) 55125

( * ) Notice: Subject to any disclaimer, the term of this patent is extended or adjusted under 35 U.S.C. 154(b) by 0 days.

(21) Appl. No.: 10/648,834

(22) Filed: Aug. 26, 2003

(65) Prior Publication Data

US 2004/0130125 A1 Jul. 8, 2004

Related U.S. Application Data

(63) Continuation-in-part of application No. 10/156,266, filed on May 28, 2002, now abandoned.

(51) Int. Cl.$^7$ ................................................. B60D 1/60
(52) U.S. Cl. ....................... 280/507; 150/166; 280/511; 280/770
(58) Field of Search ................................ 280/507, 511, 280/770, 506, 480, 480.1; 150/154, 166; 296/136.1, 136.13

(56) References Cited

U.S. PATENT DOCUMENTS

| | | |
|---|---|---|
| 3,491,847 A | 1/1970 | Abbott |
| 3,557,298 A | 1/1971 | Thompson et al. |
| 4,858,361 A | 8/1989 | White |
| 5,048,217 A | 9/1991 | Easter |
| RE34,832 E * | 1/1995 | Lechuga ........................ 428/99 |
| 5,806,873 A * | 9/1998 | Glassman .................... 280/507 |
| 6,022,038 A | 2/2000 | Maxwell et al. |
| 6,039,339 A | 3/2000 | Bello |
| 6,113,142 A | 9/2000 | Tolbert |
| 6,325,121 B1 | 12/2001 | Hudnall |
| 6,332,853 B1 | 12/2001 | Bowman |
| 6,412,806 B1 | 7/2002 | Peacock |
| 2002/0084643 A1 * | 7/2002 | Trampe ....................... 280/770 |

FOREIGN PATENT DOCUMENTS

| | | |
|---|---|---|
| DE | 3635730 A1 | 6/1988 |
| GB | 2 255 538 A | 11/1992 |

* cited by examiner

Primary Examiner—Anne Marie Boehler
(74) Attorney, Agent, or Firm—Patterson, Thuente, Skaar & Christensen, P.A.

(57) ABSTRACT

A cover shield for a trailer coupler comprising an elongated hollow, tubular shield, internally sized to receive the forward portion of a trailer coupler and coupler means mounted thereon. The shield is preferably of flexible two-ply padded material and impervious to moisture. The shield includes a pouch-like portion sized to snugly encompass and cover the trailer coupler means. A seam means extends longitudinally from an aft opening toward the front opening and may be selectively manually opened to an open mode and closed to a closed mode.

20 Claims, 6 Drawing Sheets

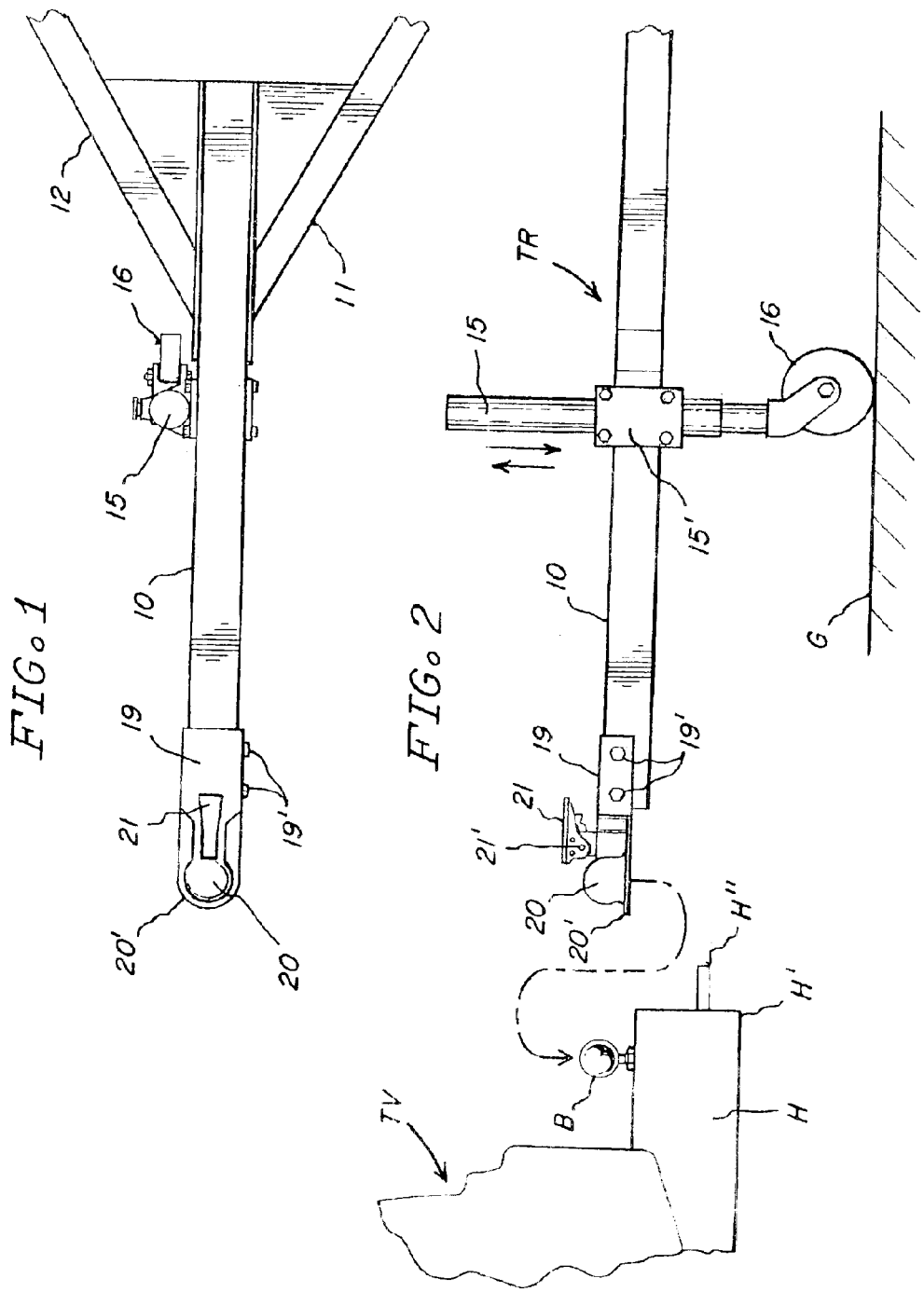

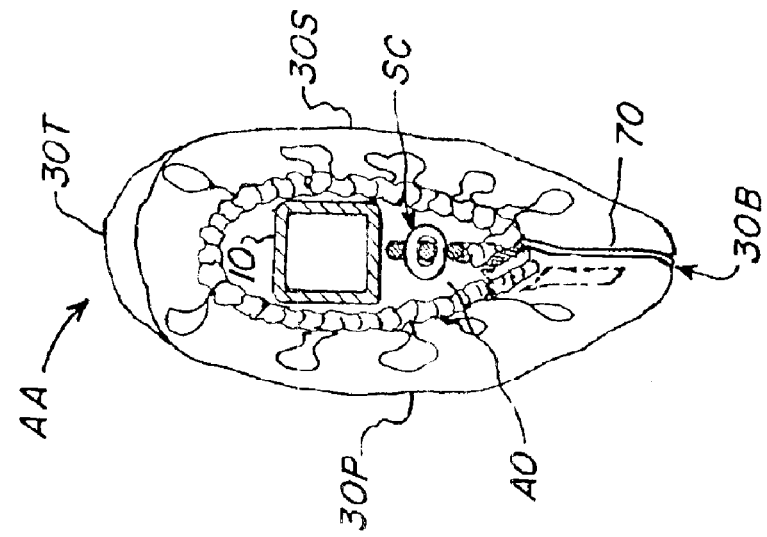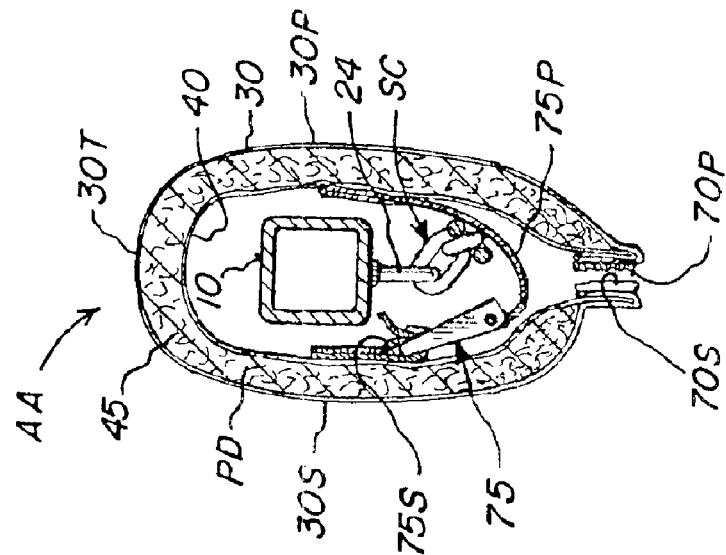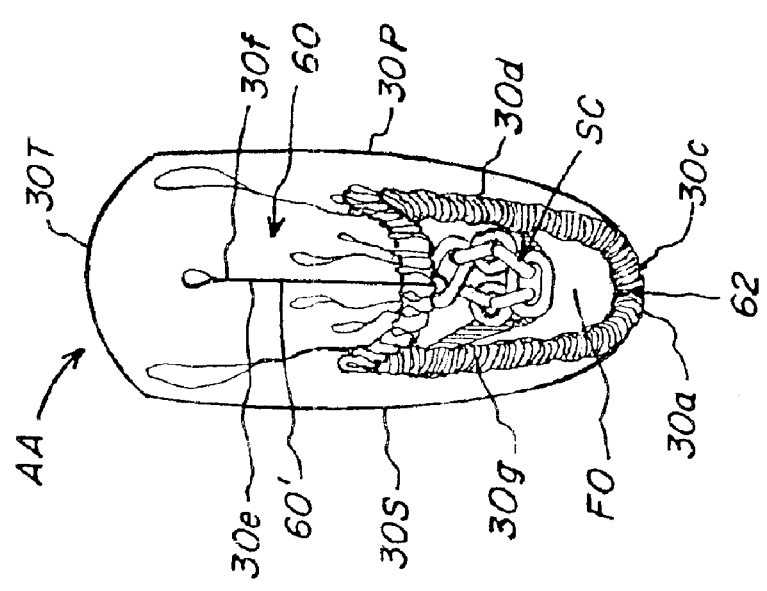

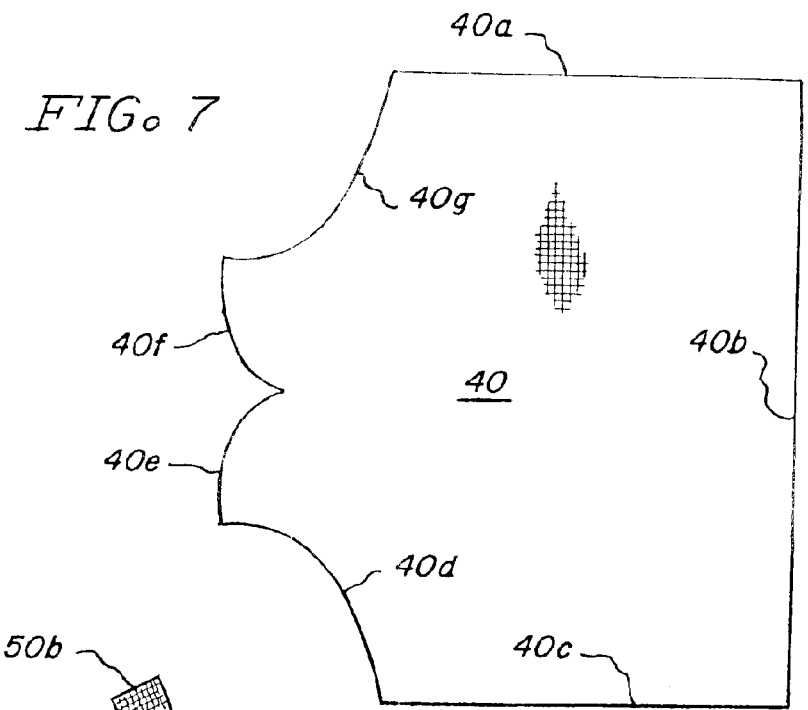
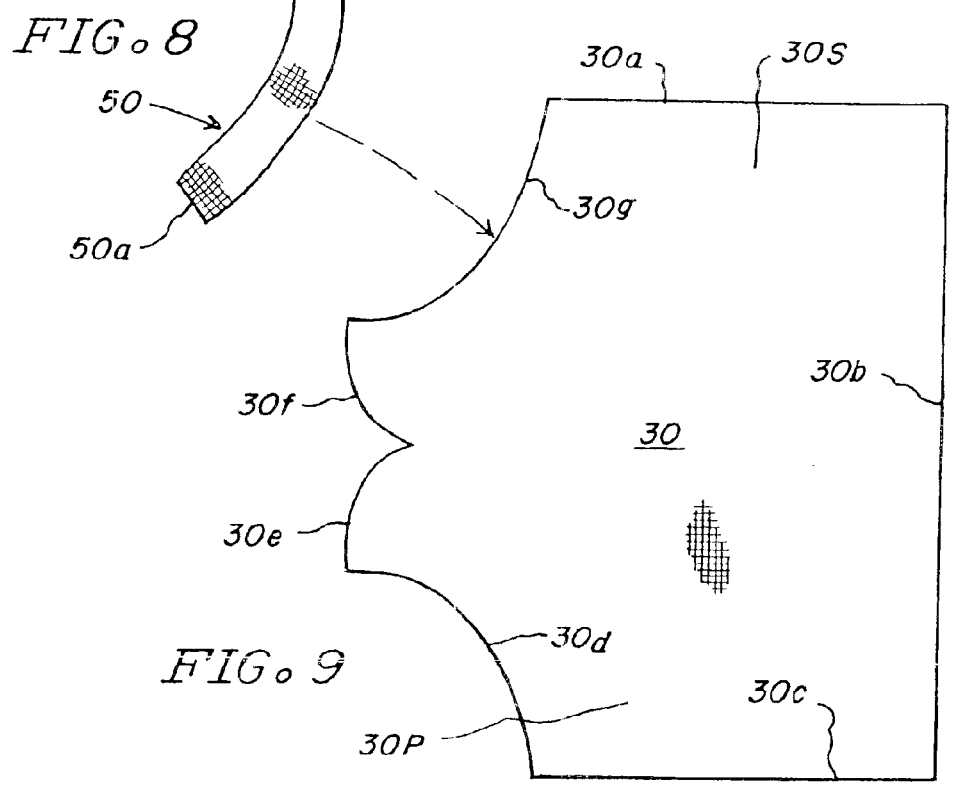

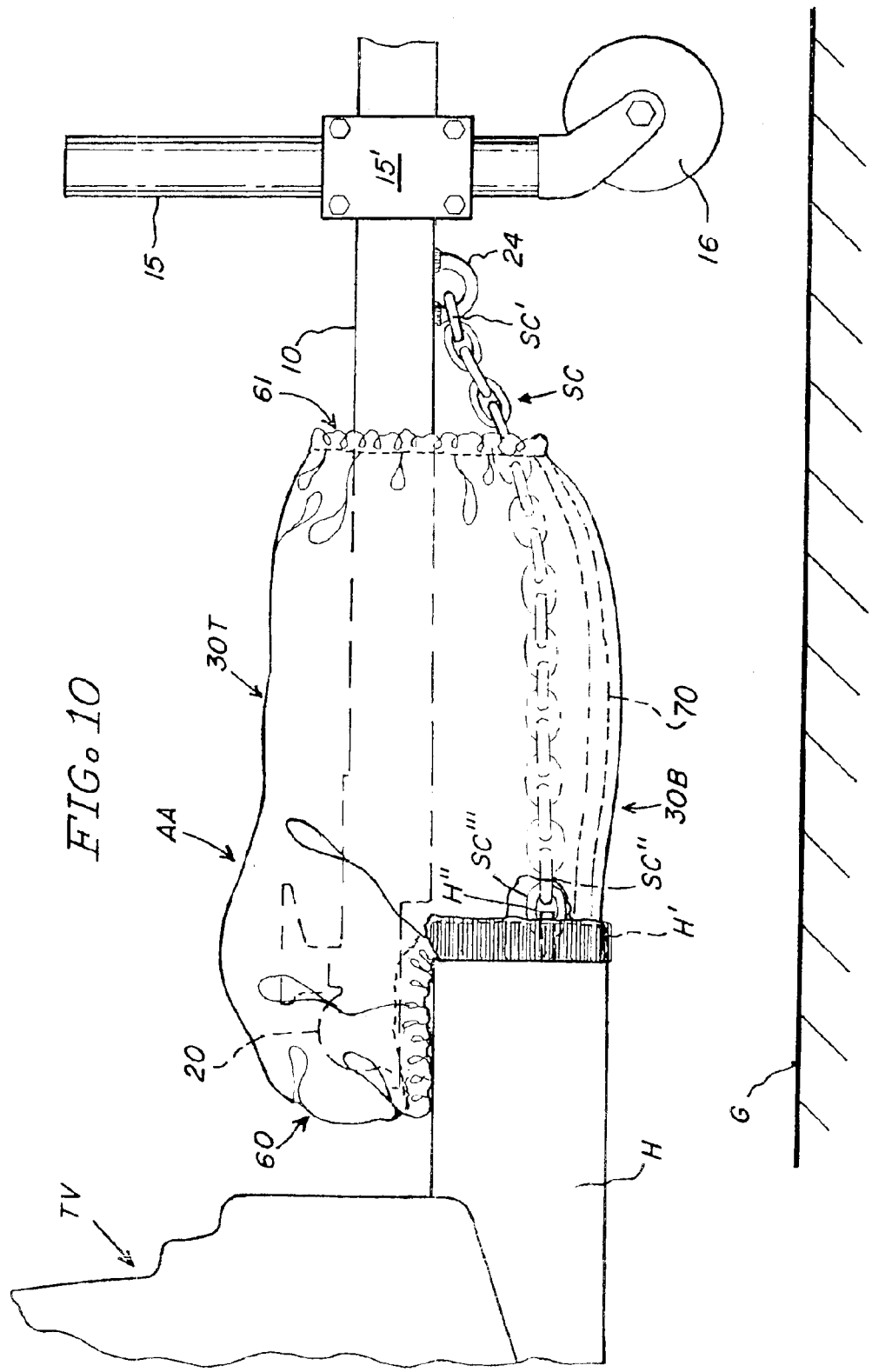

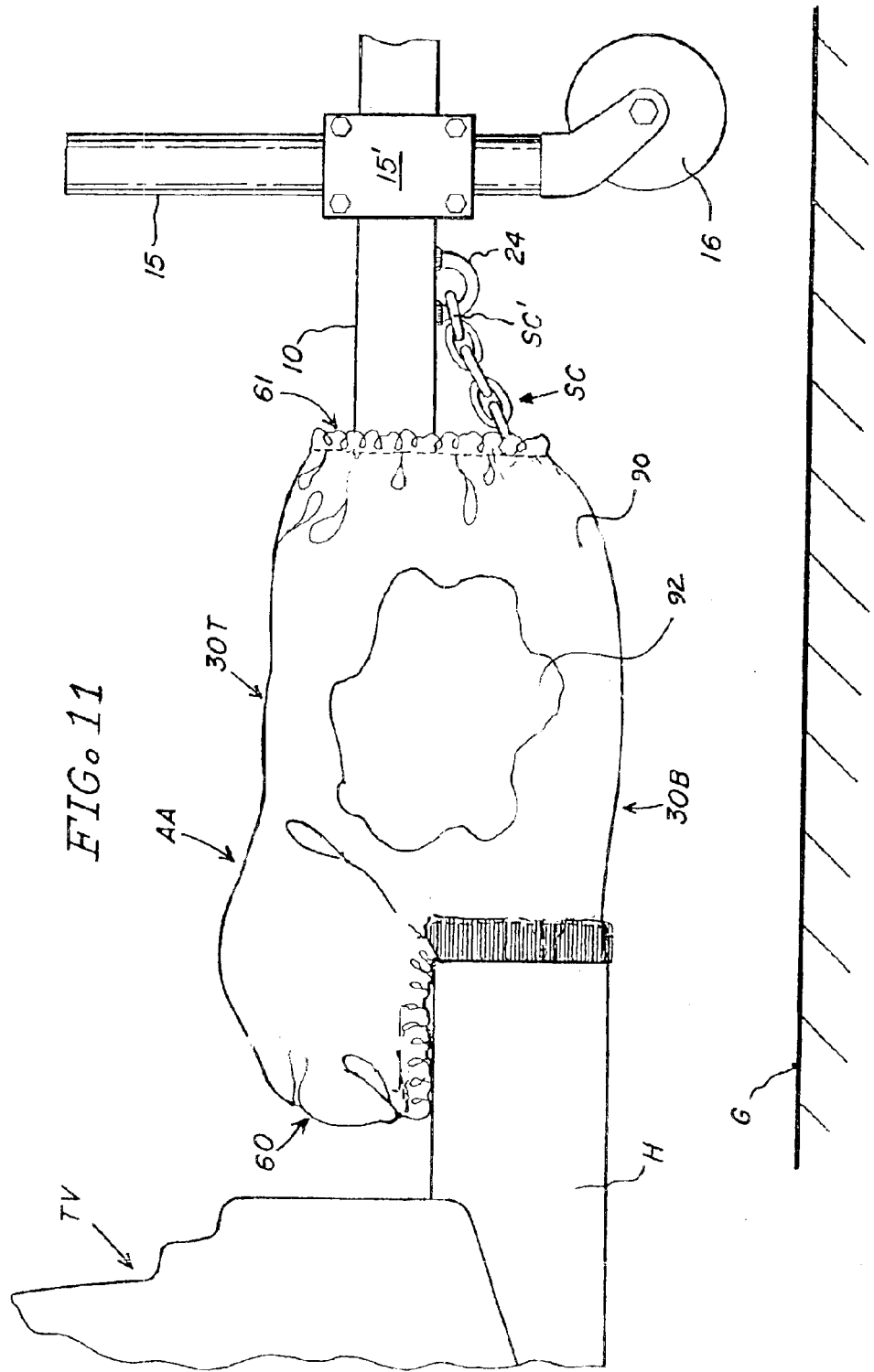

US 6,857,652 B2

SHIELD FOR TRAILER COUPLER

RELATED APPLICATIONS

This application is a continuation-in-part of application Ser. No. 10/156,266 filed May 28, 2002, now abandoned.

FIELD OF THE INVENTION

The present invention relates to vehicular trailers, and more specifically to covers for the hitch portions of vehicular trailers.

BACKGROUND OF THE INVENTION

The present invention provides a unique and multifunction cover or shield for a trailer coupler which alleviates two significant problems.

A trailer coupler, by definition, provides a means for coupling or attaching a trailer to a towing vehicle. Trailers have been and continue to be in widespread use for hauling a wide variety of cargos, e.g., boats. When trailers are detached from a towing vehicle they of course are at rest, and many trailers have a support means for supporting the forward portion of the trailer so that the trailer maintains substantially the same attitude about its pitch axis as it would have when attached to a towing vehicle. The trailer comprises in part a longitudinally-extending member. At the very forward end of said member is a coupler means which is adapted to be attached to a ball trailer hitch on the towing vehicle. The coupler means in most cases comprises an inverted cup-like member for receiving a ball trailer hitch, and the cup-like member typically has a horizontally extending rim or flange portion around the periphery thereof. The aforesaid flange portion is relatively thin, e.g., one-eighth of an inch, and thus poses a serious safety hazard if once accidentally or otherwise bumps into it, which unfortunately, occurs far too frequently. The present invention solves this problem.

Another issue associated with trailer couplers is that they are exposed to the weather, both when the trailer is at rest detached from the towing vehicle, and also when the trailer is attached to the towing vehicle. The trailer coupler has some moving parts and further, usually there are auxiliary apparatus such as safety chains and electrical connecting wires which can be adversely affected by the weather and also by factors such as "kicked-up" stones or other debris from the roadway as the trailer is in forward motion with the towing vehicle. The present invention provides a weatherproof enclosure for the trailer coupler and associated auxiliary apparatus.

SUMMARY OF THE INVENTION

In broad terms, the present invention provides a cover and a shield for a trailer coupler having a coupler means mounted on the forward portion of a longitudinally extending member of a trailer. The coupler means is adapted to be attached to a ball trailer hitch on a towing vehicle. The cover specifically comprises an elongated, hollow tubular shield having a longitudinal fore and aft axis, a forward end, an aft end, a top, a bottom, port and starboard sides, a forward opening, and an aft opening. The shield is dimensioned or internally sized so as to receive the forward portion of the longitudinally extending member of the trailer and the coupler means mounted thereon. Thus, prior to the trailer being attached to the towing vehicle, the shield may be assembled with the trailer coupler the coupler means mounted thereon with the aft end of the shield being positioned aft of the coupler means and with the forward end of the shield being positioned around the coupler means to thereby provide a protective covering around the coupler means and a substantial portion of the forward portion of the longitudinally-extending member of the trailer. Thus, both of the above-described problems are addressed and solved.

The forward opening of the shield is sized to receive a ball trailer hitch when the coupler means is attached to the trailer hitch. The shield, in the preferred embodiment, is fabricated from a flexible material which includes a layer of padding, and at least the outer surface, and preferably the inner surface, of the shield and is impervious to moisture. Also in the preferred embodiment, the forward end of the shield includes a pouch-like portion sized to snugly encompass and cover the coupler means.

In the preferred embodiment, the shield further includes a seam means extending longitudinally along the bottom of the shield from the aft opening forward towards the front opening. The seam means may be selectively manually opened to an open mode and/or closed to a closed mode so as to facilitate the installation of the shield onto the forward portion of said member and the coupler means mounted thereon.

In another aspect of the invention, the shield presents relatively large side surfaces suitable for displaying graphic material when installed on the trailer coupler.

Finally, the preferred embodiment of the invention includes strap means attached within the inside of the shield for providing a support function for auxiliary apparatus such as safety changes and electrical wire means.

DESCRIPTION OF THE DRAWINGS

FIG. 1 is a plan view of the front portion of a trailer;

FIG. 2 is an elevation view or side view of the apparatus depicted in FIG. 1;

FIGS. 4, 5, and 6 are cross-sectional views of the apparatus depicted in FIG. 3 as viewed, respectively, along section lines 4—4, 5—5, and 6—6 of FIG. 3.

FIGS. 7, 8, and 9 depict, respectively, layouts of the material 40, 50, and 30, used in fabricating the shield;

FIG. 10 depicts the apparatus of FIG. 3 attached to a ball trailer hitch of a towing vehicle; and FIG. 11 depicts an embodiment of the present invention wherein graphic indicia is displayed on side surfaces of the shield.

DETAILED DESCRIPTION OF THE INVENTION

Figure 3:
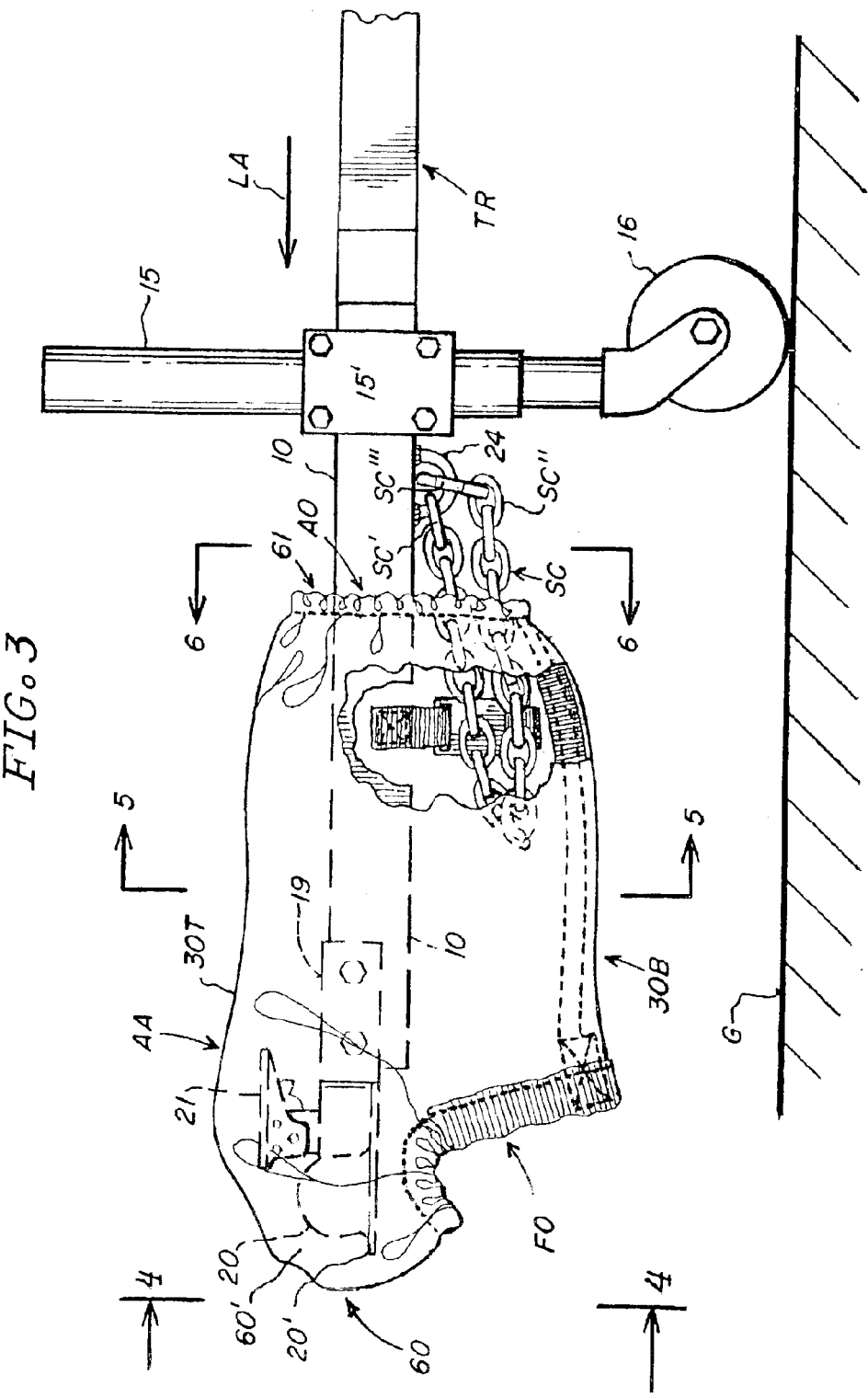
FIG. 3 is a port-side elevational view of the front portion of a trailer with the safety shield mounted thereon.

The front portion of a typical trailer TR is depicted in FIGS. 1 and 2. The trailers have a longitudinally-extending member (see FIG. 3 for a depiction of the longitudinal axis LA). For the trailer depicted, the longitudinally-extending member is a single beamlike member 10 with side braces 11 and 12. A vertically adjustable support member 15 passes through a gearbox 15' and at the lower end thereof has a support wheel 16 or equivalent for resting on the ground G when the trailer is detached from a towing vehicle, and which is moved upwardly out of contact with the ground when the trailer is attached to a towing vehicle as is depicted in FIG. 10.

A coupler means is attached to the forward end of the beam 10. The coupler means comprises a bracket portion 19 attached with bolt means 19' and, at the forward end thereof is an inverted cup 20 sized to receive a ball of a hitch member H which is integrally attached to a towing vehicle TV. A typical lever-type member 21 which is pivoted at 21' may be used for locking the inverted cup 20 to the ball B as is well know by those skilled in the art.

Referring to FIG. 3, the unique cover/shield AA is shown in the "trailer at rest" mode, i.e., trailer not attached to a towing vehicle. In broad terms, the shield AA is an elongated, hollow, tubular device having a longitudinal fore and aft axis LA, a forward end 60, an aft end 61, a top 30T, a bottom 30B, port and starboard sides 30P and 30S (see FIGS. 4–6), a forward opening FO and an aft opening AO. As is clear from FIGS. 3–6 and 10, the shield AA is sufficiently dimensioned or internally sized so as to receive both the forward portion of member 10 of the trailer, as well as the coupler means 19–21 mounted thereon. Thus, the shield may be assembled with the trailer coupler and coupler means with the forward end of the shield being positioned around the coupler means and with the aft end of the shield being positioned aft of the coupler means. In the preferred embodiment of the invention the cover AA is configured to include, at forward end 60, a pouch-like portion 60' sized to snugly encompass the coupler means as is clearly shown in FIG. 3. In this trailer-at-rest position, it is seen that the cover shield AA is totally encompassing the coupler means 20, with the forward opening FO of the shield AA well below the member 20.

The preferred embodiment of the invention provides a shield with a two-ply construction, i.e., an outer layer 30 and an inner layer 40 sandwiching therebetween padding material PD, all as is clearly depicted in FIG. 5. FIGS. 9 and 7 respectively depict the material pieces 30 and 40 when laid out prior to fabrication, together with a member 50 shown in FIG. 8, which is adapted to be part of the front opening FO upon final assembly. Referring to FIG. 9, the surfaces of sides of the piece 30 are respectively (starting at top and proceeding clockwise) 30a–30g and, correspondingly, for member 40, the sides or surfaces are 40a–40g. Member 50 shown in FIG. 8 has end surfaces 50A and 50B, and side surfaces 50' and 50".

The forward and aft openings FO and AO are elasticized in the preferred embodiment to provide a snug fit.

To facilitate easy assembly and disassembly of the shield with the trailer coupler means, a seam means 70 is provided which extends longitudinally from the aft opening AO toward the front opening FO. The seam means 70 in the preferred embodiment is a hook-and-loop fastening arrangement with the co-acting surfaces being identified in FIG. 5 by reference numerals 70P and 70S. The seam means 70 is configured so that it may be opened fully at the aft opening AO all the way to, but not including, the front opening FO.

An optional feature of the invention, but on that is included in the preferred embodiment, is to have a strap means 75 with two separate elements 75P and 75S shown in FIG. 5 adapted to be connected together selectively so as to support auxiliary apparatus such as a safety chain SC shown clearly in FIGS. 3–6 and 10. A typical safety chain configuration is to have one end SC' of the chain connected to a bracket 24 on member 10, the other end SC" and a decoupling link SC'" being attached to a connector H", at the end H' of hitch H of the towing vehicle.

Thus, both of the above described problems are solved by the shield AA. The pouch 60' at the front of the shield provides a layer of protection around the sharp periphery 20' of cup 20 to prevent injuries. The shield AA provides an excellent protection for the coupler means with respect to weather and dynamic road factors. The support of auxiliary apparatus by strap 75 is an additional important feature of the invention.

In another embodiment of the invention depicted in FIG. 11, the side portions 30P and 30S present relatively large and substantially vertical side surfaces 90. Any type of graphical indicia 92 may be displayed on side surfaces 90 as desired. Graphical indicia 92 may include for example, but is not limited to, advertising messages or logos, instructions or warning information, or informational and decorative images. The graphical indicia 92 may be a separate member affixed by sewing, adhesives or any other means, or may be imprinted directly on the side surfaces 90 by printing, embossing, screen printing, embroidery, or any other suitable method.

While the preferred embodiment of the invention has been illustrated, it will be understood that variations maybe made by those skilled in the art without departing from the inventive concept. Accordingly, the invention is to be limited only by the scope of the following claims.

What is claimed is:

1. A cover for a trailer coupler having a coupler means mounted on the forward portion of a longitudinally extending member of a trailer, said coupler means being adapted to be attached to a ball trailer hitch on a towing vehicle and including an inverted cup portion for receiving the ball hitch, said cup portion having a periphery, said trailer coupler and said ball hitch each presenting geometrically complex outer surfaces, said cover comprising:

an elongated, hollow tubular shield formed from flexible material, said shield having a longitudinal fore and aft axis, a forward end, an aft end, a top, a bottom, port and starboard sides, said forward end having a forwardly extending upper portion defining a pouch for receiving the inverted cup portion therein, said pouch having a downwardly directed opening defined in a bottom side thereof, said downwardly directed opening having a periphery adapted to fit snugly around the periphery of said inverted cup portion, a lower portion of said forward end having a forwardly directed opening defined therein, said forwardly directed opening having a periphery adapted to fit snugly around the ball trailer hitch when said trailer coupler is attached to the ball trailer hitch, said aft end having a rearwardly directed aft opening defined therein, said aft opening having a periphery adapted to fit around the longitudinally extending member of the trailer, said shield being internally sized to receive said forward portion of said member of said trailer and said coupler means mounted thereon, whereby the peripheries of the openings of said shield are sealingly engagable with the geometrically complex outer surfaces of said trailer coupler and said ball hitch so that said cover provides a substantially weather resistant enclosure for said trailer coupler when said trailer coupler is attached to said ball hitch.

2. The cover of claim 1, wherein the port and starboard sides of said cover each present a surface for displaying graphical indicia.

3. The cover of claim 1, wherein said forward and aft openings are elasticized.

4. The cover of claim 1, further including strap means within said shield adapted to support longitudinally extending auxiliary apparatus within said shield.

5. The cover of claim 1, wherein said flexible material includes a layer of padding and at least the outer surface of said shield is impervious to moisture.

6. The cover of claim 1, wherein said shield further includes a seam means extending longitudinally from proximate said aft opening toward said front forwardly directed opening and which may be selectively manually opened and closed to facilitate the installation of said shield onto said forward portion of said member and said coupler means mounted thereon.

7. The cover of claim 6, wherein said seam means extends longitudinally along said bottom of said shield.

8. The cover of claim 7, wherein said seam means includes coacting selective locking means on the bottom edges of said port and starboard sides of said shield.

9. The cover of claim 8, wherein said seam means includes fastening means on said bottom edges of said port and starboard sides of said shield.

10. The cover of claim 6, including strap means within said shield adapted to support longitudinally extending auxiliary apparatus within said shield and wherein said seam means, when in the open mode, facilitates access to said strap means.

11. A weather resistant trailer coupler and vehicle hitch apparatus comprising:

a hitch portion adapted to be attachable to a vehicle, said hitch portion including a ball;

a coupler portion operably couplable to the hitch and adapted to be attachable to a forward portion of a longitudinally extending member of a trailer, said coupler including an inverted cup portion for receiving the ball of said hitch, the cup portion having a periphery; and a cover portion including an elongated, hollow tubular sleeve formed from flexible material, said sleeve having a longitudinal fore and aft axis, a forward end, an aft end, a top, a bottom, and a pair of opposing sides, said forward end having a forwardly extending upper portion defining a pouch for receiving the inverted cup portion therein, said pouch having a downwardly directed opening defined in a bottom side thereof, said downwardly directed opening having a periphery adapted to fit snugly around the periphery of said inverted cup portion, a lower portion of said forward end having a forwardly directed opening defined therein, said forwardly directed opening having a periphery adapted to fit snugly around the hitch portion when the coupler portion is coupled to the hitch portion, the aft end having a rearwardly directed aft opening defined therein, said aft opening having a periphery adapted to fit around the longitudinally extending member of the trailer, the sleeve being internally sized to receive the forward portion of the longitudinally extending member of the trailer and the coupler portion coupled thereto, whereby the peripheries of the openings of the sleeve are sealingly engagable with the outer surfaces of the coupler portion and the hitch portion so that the cover provides a substantially weather resistant enclosure for the trailer coupler when the coupler portion is coupled to the hitch portion.

12. The apparatus of claim 11, wherein said forward and aft openings are elasticized.

13. The apparatus of claim 11, wherein each of said opposing sides of said sleeve presents a surface for displaying graphical indicia.

14. The apparatus of claim 11, further including a strap within said sleeve for supporting longitudinally extending auxiliary apparatus within said sleeve.

15. The apparatus of claim 11, wherein said flexible material includes a layer of padding and at least the outer surface of said sleeve is impervious to moisture.

16. The apparatus of claim 11, wherein said sleeve further includes a longitudinally oriented opening extending from proximate said aft opening toward said forwardly directed opening, said longitudinally oriented opening being selectively manually openable and closable to facilitate the installation of said sleeve onto said hitch portion and said coupler portion.

17. The apparatus of claim 16, wherein said longitudinally oriented opening extends along said bottom of said sleeve.

18. The apparatus of claim 17, wherein said longitudinally oriented opening includes coacting selective locking means on the bottom edges of said opposing sides of said shield.

19. The apparatus of claim 18, wherein said longitudinally oriented opening includes fastening means on said bottom edges of said port and starboard sides of said sleeve.

20. The apparatus of claim 16, including a strap within said sleeve adapted to support longitudinally extending auxiliary apparatus within said sleeve, and wherein said longitudinally oriented opening, when in the open mode, facilitates access to said strap.

* * * * *